United States Patent
Mahajan et al.

(10) Patent No.: US 10,839,167 B2
(45) Date of Patent: Nov. 17, 2020

(54) SYSTEMS AND METHODS FOR DYNAMICALLY EXPANDING NATURAL LANGUAGE PROCESSING AGENT CAPACITY

(71) Applicant: Verizon Patent and Licensing Inc., Arlington, VA (US)

(72) Inventors: Trisha Mahajan, Princeton Junction, NJ (US); Stephen Soltys, Warren, NJ (US); Neil Thomas Razzano, Hillsborough, NJ (US); Sankar Shanmugam, Dayton, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 83 days.

(21) Appl. No.: 16/209,783

(22) Filed: Dec. 4, 2018

(65) Prior Publication Data
US 2020/0175118 A1    Jun. 4, 2020

(51) Int. Cl.
*G06F 40/40*     (2020.01)
*G10L 17/00*     (2013.01)
*G10L 17/22*     (2013.01)
*G10L 15/183*    (2013.01)

(52) U.S. Cl.
CPC ............ *G06F 40/40* (2020.01); *G10L 15/183* (2013.01); *G10L 17/005* (2013.01); *G10L 17/22* (2013.01)

(58) Field of Classification Search
CPC .......... G06F 17/00; G06F 17/30; G06F 40/40; G06F 3/0484; G06F 3/16; G06F 3/167; G06F 40/30; G06F 40/35; G06F 40/211; G06F 40/279; G06Q 50/06; G06Q 10/107; G06N 99/00; G06N 5/022; G10L 15/18; G10L 15/183; G10L 15/22; G10L 17/00; G10L 17/005; G10L 17/04; G10L 17/22; G10L 15/1822; G10L 15/32; G10L 17/02; H04L 12/58; H04L 29/08; H04L 51/02; H04L 51/14; H04L 67/306; H04M 3/487; H04M 3/523; H04M 3/527
USPC ......... 704/9, 257, 258, 275; 705/5; 707/776; 718/102; 379/265.07; 706/11
See application file for complete search history.

(56) References Cited

U.S. PATENT DOCUMENTS

| | | | | |
|---|---|---|---|---|
| 8,660,849 | B2 * | 2/2014 | Gruber | G06F 40/30 |
| | | | | 704/275 |
| 9,715,496 | B1 * | 7/2017 | Sapoznik | G06N 3/08 |
| 9,858,925 | B2 * | 1/2018 | Gruber | G10L 15/18 |
| 10,276,170 | B2 * | 4/2019 | Gruber | G06F 16/2457 |
| 10,388,272 | B1 * | 8/2019 | Thomson | G06F 40/44 |
| 10,424,302 | B2 * | 9/2019 | Shah | G10L 15/16 |
| 10,460,215 | B2 * | 10/2019 | Herold | G06K 9/00 |

(Continued)

OTHER PUBLICATIONS

Dialogflow, "Intents Overview," (available at https://dialogflow.com/docs/intents, visited Oct. 31, 2018).

*Primary Examiner* — Gerald Gauthier

(57) ABSTRACT

A system described herein may provide for the adaptation and/or expansion of a natural language processing ("NLP") platform, that supports only a limited quantity of intents, such that the described system may support an unlimited (or nearly unlimited) quantity of intents. For example, a hierarchical structure of agents may be used, where each agent includes multiple intents. A top-level (e.g., master) agent may handle initial user interactions, and may indicate a next-level agent to handle subsequent interactions.

20 Claims, 16 Drawing Sheets

(56) References Cited

U.S. PATENT DOCUMENTS

| | | | |
|---|---|---|---|
| 10,579,835 B1* | 3/2020 | Phillips | G06F 40/30 |
| 2012/0016678 A1* | 1/2012 | Gruber | G06F 3/167 |
| | | | 704/275 |
| 2013/0152092 A1* | 6/2013 | Yadgar | G10L 15/22 |
| | | | 718/102 |
| 2013/0275164 A1* | 10/2013 | Gruber | G06Q 10/02 |
| | | | 705/5 |
| 2013/0339022 A1* | 12/2013 | Baldwin | G10L 15/22 |
| | | | 704/257 |
| 2014/0067375 A1* | 3/2014 | Wooters | G06F 40/40 |
| | | | 704/9 |
| 2014/0301540 A1* | 10/2014 | Skiba | G06F 40/40 |
| | | | 379/265.07 |
| 2014/0365407 A1* | 12/2014 | Brown | G06F 16/63 |
| | | | 706/11 |
| 2015/0066479 A1* | 3/2015 | Pasupalak | G06F 16/9535 |
| | | | 704/9 |
| 2015/0142447 A1* | 5/2015 | Kennewick | G10L 15/22 |
| | | | 704/275 |
| 2015/0286747 A1* | 10/2015 | Anastasakos | G06F 16/9017 |
| | | | 707/776 |
| 2016/0071517 A1* | 3/2016 | Beaver | G10L 15/22 |
| | | | 704/9 |
| 2016/0259623 A1* | 9/2016 | Sumner | H04L 67/10 |
| 2017/0068423 A1* | 3/2017 | Napolitano | H04N 21/42203 |
| 2017/0068670 A1* | 3/2017 | Orr | G06F 3/167 |
| 2017/0206064 A1* | 7/2017 | Breazeal | G06F 8/36 |
| 2017/0300831 A1* | 10/2017 | Gelfenbeyn | G06F 16/3329 |
| 2017/0358299 A1* | 12/2017 | Schlesinger | G06F 16/3329 |
| 2018/0190274 A1* | 7/2018 | Kirazci | G10L 15/1815 |
| 2018/0329982 A1* | 11/2018 | Patel | G06F 16/3322 |
| 2018/0330721 A1* | 11/2018 | Thomson | G10L 15/1815 |
| 2019/0020606 A1* | 1/2019 | Vasudeva | H04L 51/02 |
| 2019/0037077 A1* | 1/2019 | Konig | G10L 15/1815 |
| 2019/0066694 A1* | 2/2019 | Hirzel | G10L 15/22 |
| 2019/0147849 A1* | 5/2019 | Talwar | G10L 15/06 |
| | | | 704/258 |
| 2019/0180757 A1* | 6/2019 | Kothari | G10L 15/08 |
| 2019/0324527 A1* | 10/2019 | Presant | G06F 8/31 |
| 2019/0327331 A1* | 10/2019 | Natarajan | G06K 9/6269 |
| 2019/0341055 A1* | 11/2019 | Krupka | G10L 17/04 |
| 2019/0349477 A1* | 11/2019 | Kotak | G06F 40/30 |
| 2019/0371318 A1* | 12/2019 | Shukla | G10L 15/32 |
| 2020/0118223 A1* | 4/2020 | Singh | G06F 40/117 |
| 2020/0135209 A1* | 4/2020 | Delfarah | G10L 17/005 |

* cited by examiner

900

| User input | Last intent [from master agent] | Other input context | Agent |
|---|---|---|---|
| <I want to look at my bill> | Intent_1,997 | {505-1, 505-3, 505-4} | 400-1 |
| <I want to change my bill> | Intent_1,997 | {505-1, 505-2, 505-3} | 400-2 |
| <I want to redeem a gift card> | Intent_1,997 | {505-5} | 400-1 |
| <I want to speak to tech support> | Intent_1,998 | { } | 400-3 |
| <I want to speak to sales support> | Intent_1,998 | {505-6, 505-7} | 400-4 |

| User ID | Agent | Conversation active |
|---|---|---|
| User_A | 400-1 | Yes |
| User_B | 400-2 | Yes |
| User_C | 400-3 | No |

FIG. 13

SYSTEMS AND METHODS FOR DYNAMICALLY EXPANDING NATURAL LANGUAGE PROCESSING AGENT CAPACITY

BACKGROUND

Natural language processing ("NLP") is a technique that allows for individuals to interact with devices or systems in a conversational manner. Existing NLP-related systems, such as the Dialogflow® system, provide services to assist with NLP techniques. Briefly, existing NLP-related systems may make use of "intents," which are data structures that are used to handle user input and process them accordingly. However, existing NLP-related systems may have static limits on the number of supported intents (e.g., a maximum of 2,000 intents). This hard limit may limit or prevent NLP implementations where a higher number of intents are desired to be supported.

BRIEF DESCRIPTION OF THE DRAWINGS

FIG. 9 illustrates mapping information that may be stored to assist in the routing of user input by an Agent Routing Component, in accordance with some embodiments;

FIG. 13 illustrates an example data structure to maintain the conversation status of a set of users;

DETAILED DESCRIPTION OF THE PREFERRED EMBODIMENTS

The following detailed description refers to the accompanying drawings. The same reference numbers in different drawings may identify the same or similar elements.

Natural language processing ("NLP") techniques may involve the use of "black box" or "off-the shelf" components or systems. Some existing systems, such as the Dialogflow® system, provide for a maximum quantity of intents, in order to process user input in accordance with design objectives of a developer or entity who wishes to use such systems. While the maximum quantity may be suitable for some purposes, other purposes may require a higher quantity of intents to be supported. While one solution would be for the maximum quantity of supported intents to be raised by a vendor or other entity that provides these systems, it may not be technically or financially feasible to raise this quantity. Further, because NLP systems may be built, maintained, etc. by entities that are separate from entities that implement or use these systems, it may not be possible to adjust the structure of the NLP systems themselves. Thus, a need exists for adapting existing NLP systems (e.g., which only support a specified hard limit of intents) to support more intents.

While discussed in greater detail herein, the term "intent" generally refers to information that can be used to handle a given user input, in the context of what has already been received from and outputted to the user. The handling may include determining an appropriate response for the user, determining an item of content (e.g., a video, an image, an audio clip, etc.) to provide to the user, and/or performing some other action. The handling may also include storing and/or modifying context information, such that subsequent user interactions can refer back to the present interaction (e.g., which can give the user the impression of carrying on a dialog or conversation).

In some embodiments, NLP systems may use NLP agents (sometimes referred to herein simply as "agents"), which may include a set of intents, as well as logic to determine which agent should process a given user input. However, as mentioned above (and as discussed further below with respect to FIG. 2), each agent may have a maximum limit on the quantity of intents supported.

Figure 1:
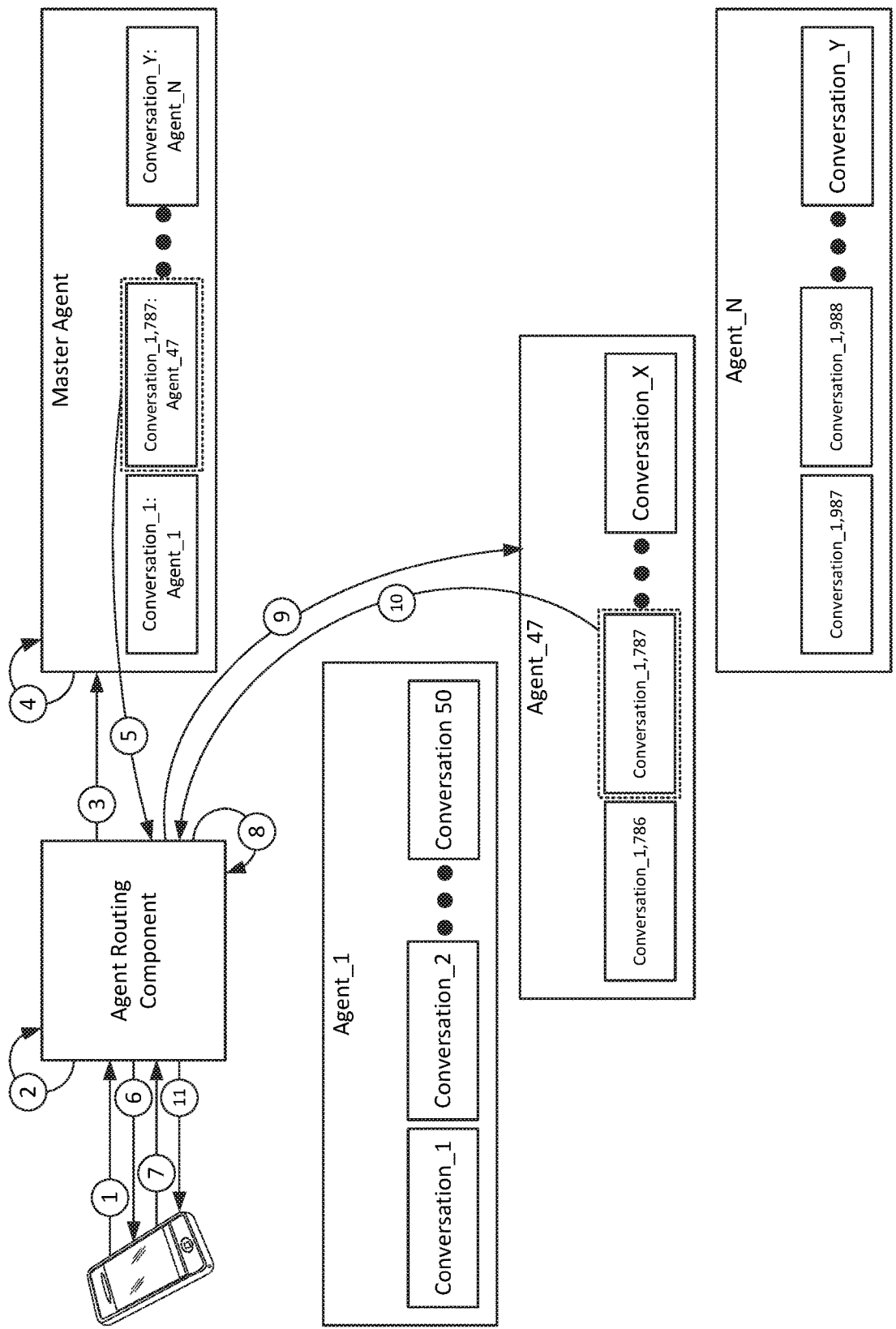
FIG. 1 illustrates an example overview of one or more embodiments described herein.

Some embodiments may utilize agents in a hierarchical manner, which may vastly enhance the number of available intents that can be supported by an NLP system. Further, the techniques described herein require no modification of the definitions of existing NLP systems, and are thus useable in a variety of scenarios. For example, FIG. 1 shows a Master Agent (which may be considered a higher, or highest, level in the hierarchy) and Agents 1-N (which may be considered a lower level in the hierarchy than the Master Agent). Also pictured is an Agent Routing Component ("ARC"), which may route user input to an appropriate agent (e.g., the Master Agent or one of the lower level agents, such as Agent_1, Agent_47, or Agent_N).

As shown, the ARC may receive (at 1) user input. The user input may be received from a user device, such as mobile phone, a tablet computer, a desktop computer, an interactive kiosk, etc. The user input may include, in some embodiments, a natural language phrase spoken by a user of the user device. Additionally, or alternatively, the user input may include the selection of a graphical element in a graphical user interface ("GUI"), a selection of an interactive voice response ("IVR") menu, a haptic input (e.g., a swipe or a touch on a touchscreen), and/or some other input. For the purposes of this example, assume that the input received (at 1) is the first input from the particular user device by the ARC. The ARC may receive the input and may determine (at 2) whether any active conversations exist for the user (or for the user device). In this example, the ARC may determine (at 2) that an active conversation does not exist for the user. Based on the determination that a conversation is not active for the user, the ARC may provide (at 3) the user input to the Master Agent.

As shown, the Master Agent may determine (at 4) how to handle the user input. For example, the Master Agent may evaluate the user input and may determine that the user input is the starting point for a given conversation. As described below, the intents included in the Master Agent may each correspond to a starting point for different conversations, and the Master Agent may identify to which conversation the user input is related. In the example shown in FIG. 1, the Master Agent has identified that the user input is related to a particular conversation ("Conversation_1,787"). This identification may include determining that the intent, associated with Conversation_1,787, specifies a set of parameters (e.g., an input context) that matches the user input.

The Master Agent may perform actions specified in the identified intent, including outputting (at 5) a response to the ARC (where some or all of the response includes information, content, etc., to be provided to the user device, such as an answer to a question or a request for further user input). The response (outputted at 5) may also include an indication of which conversation was identified (e.g., Conversation_1, 787) in this example. In some embodiments, the response may include an indication of which agent (e.g., which agent, at a level below the Master Agent in the hierarchy) includes intents related to Conversation_1,787 (i.e., Agent_47 in this example). Additionally, or alternatively, the ARC may store mapping information that maps conversations to agents. The Master Agent may also provide context information, which may be used for handling subsequent user input.

The ARC may forward (at 6) the response to the user device. After this response is provided to the user device, the user device may provide (at 7) further user input. The ARC may determine (at 8) that an active conversation exists for the user, and may thus attempt to route the user input to the correct agent (e.g., Agent_47, which is the agent that includes the intents for the identified Conversation_1,787). The ARC may forward (at 9) the user input, as well as the context for the user, to the identified Agent_47. In some embodiments, the ARC may also include information indicating which conversation (i.e., Conversation_1,787, in this example) the user input is associated with. Agent_47 may evaluate the user input and the context, and determine that the user input and/or context match a particular agent associated with Conversation_1,787, and may forward the user input and/or context to the particular agent. Note that, for illustrative purposes, FIG. 1 shows a single box for Conversation_1,787. As discussed below, this may be a conceptual illustration to represent multiple intents that are related to the conversation.

The intent to which the input is routed (at 9) may perform a specified set of actions on the received input, which may include outputting (at 10) a response. As discussed above, the response may include an answer to a question and/or other content or information. An output context may also be outputted (at 10), which may include one or more items included in the input context (provided at 9), and/or may include additional or different items as included in the input context. The ARC may proceed to output (at 11) the response to the user device.

Figure 2:
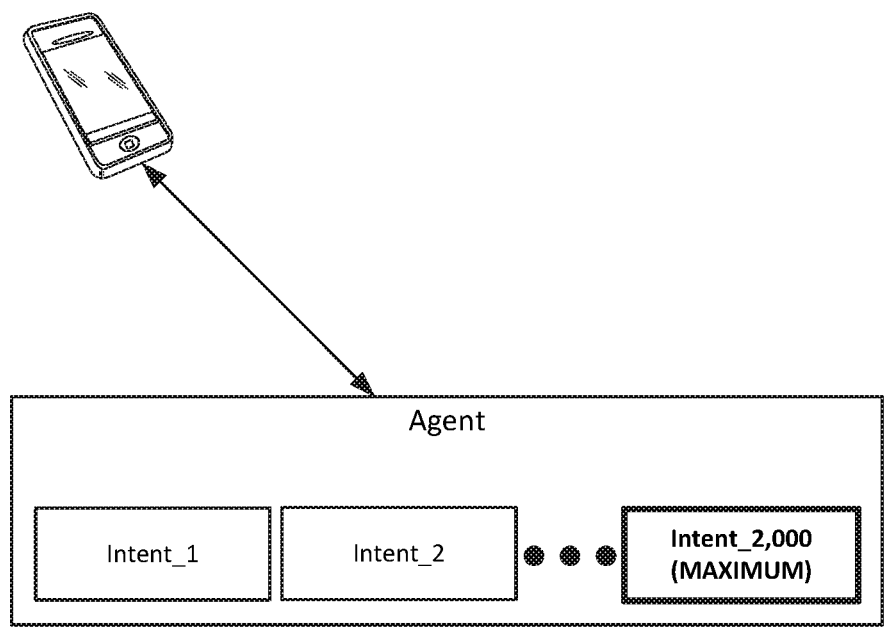
FIG. 2 illustrates an example of an NLP agent that supports only a static number of maximum intents.

As may be apparent, the hierarchical system of embodiments described herein (e.g., similar to that discussed with respect to FIG. 1), may allow for significantly more intents than a traditional single-agent implementation. An example of a single-agent implementation is shown in FIG. 2. As shown, typically a user (or user device) is able to communicate with a single agent, which may route user input to a given intent based on the user input and any existing context for the user. However, the hard limit (e.g., 2,000 in this example) imposed by a provider of the agent means that only 2,000 intents can be supported. More robust interactions, which may necessitate or otherwise benefit from more than 2,000 intents would thus be impossible. As mentioned above, the limit may be imposed by the provider based on technical constraints, financial constraints, and/or other considerations.

In contrast, embodiments described herein may support significantly more intents, without requiring the provider of an agent to alter the architecture, algorithms, or other aspects of the agents. For example, using a two-level hierarchy (e.g., one Master Agent and corresponding next-level agents) may allow for up to 4,002,000 intents to be supported (e.g., 2,000 intents in the Master Agent, where each intent in the Master Agent points to a discrete agent that itself supports 2,000 intents).

Additionally, the embodiments described herein provide a performance improvement by virtue of using a hierarchical agent structure, rather than using a "flat" or "single" agent structure. For example, in a flat or single agent structure, an agent may incur greater overhead (e.g., exponential, or otherwise increasing) processing time and/or resources when attempting to use a greater quantity of intents to determine how to handle a given user input and/or context. In contrast, in the hierarchical structure described herein, each agent may include comparatively fewer agents than a "flat" or "single" agent structure (e.g., that supports a comparable total quantity of agents). Accordingly, each agent has to evaluate a smaller quantity of intents (e.g., by one particular agent at a given level in the hierarchy), thereby consuming less processing resources and/or time while evaluating a greater quantity of intents (e.g., as compared to evaluating intents in a "flat" or "single" agent structure, in which the agent may include numerous intents that are not related to a given user input or context).

Figure 3:
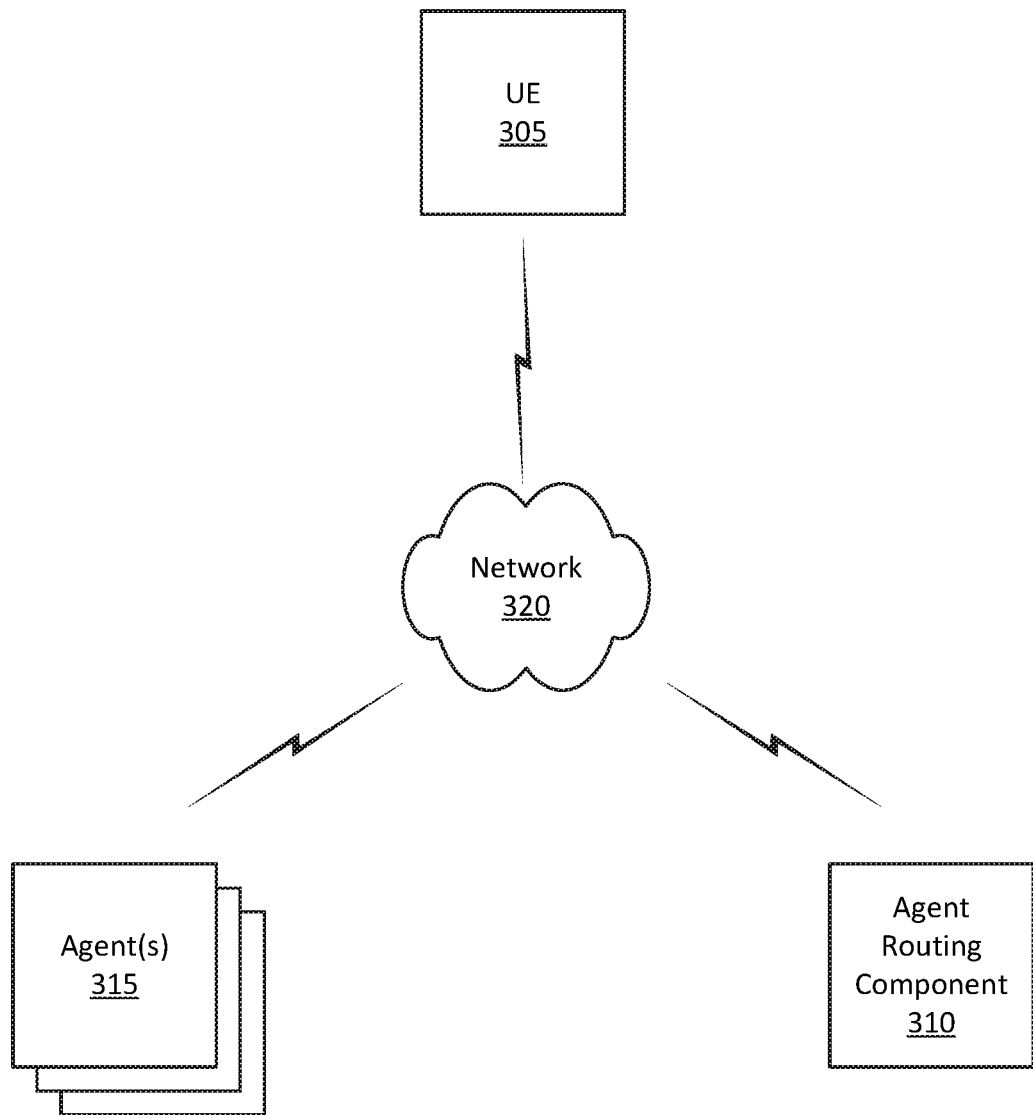
FIG. 3 illustrates an example environment in which one or more embodiments, described herein, may be implemented.

FIG. 3 illustrates an example environment 300, in which one or more embodiments, described herein, may be implemented. As shown in FIG. 3, environment 300 may include user device 305, ARC 310, one or more agents 315, and network 320. The quantity of devices and/or networks, illustrated in FIG. 3, is provided for explanatory purposes only. In practice, environment 300 may include additional devices and/or networks; fewer devices and/or networks; different devices and/or networks; or differently arranged devices and/or networks than illustrated in FIG. 3. For example, while not shown, environment 300 may include devices that facilitate or enable communication between various components shown in environment 300, such as routers, modems, gateways, switches, hubs, etc. Alternatively, or additionally, one or more of the devices of environment 300 may perform one or more functions described as being performed by another one or more of the devices of environments 300. Devices of environment 300 may interconnect with each other and/or other devices via wired connections, wireless connections, or a combination of wired and wireless connections. In some implementations, one or more devices of environment 300 may be physically integrated in, and/or may be physically attached to, one or more other devices of environment 300.

User device 305 may include any computation and communication device that is capable of communicating with one or more networks (e.g., network 320). For example, user device 305 may include a device that receives content, such as web pages (e.g., that include text content and/or image content), streaming audio and/or video content, and/or other content, via an Internet connection and/or via some other delivery technique. User device 305 may also receive user interactions (e.g., voice input, touches on a touchscreen, "clicks" via an input device such as a mouse, etc.). In some implementations, user device 305 may be or may include a radiotelephone, a personal communications system ("PCS") terminal (e.g., a device that combines a cellular radiotelephone with data processing and data communications capabilities), a personal digital assistant ("PDA") (e.g., a device that includes a radiotelephone, a pager, etc.), a smart phone, a laptop computer, a tablet computer, a camera, a television, a personal gaming system, a wearable device, and/or another type of computation and communication device.

ARC 310 may include one or more devices (e.g., a server device or a distributed set of devices, such as a cloud computing system) that perform one or more actions described herein. For example, ARC 310 may handle input from UE 305 by routing the input to a suitable agent 315.

Agents 315 may include one or more devices (e.g., a server device or a distributed set of devices, such as a cloud computing system) that perform one or more actions described herein. For example, a particular agent 315 may include a set of intents, which may be used to process user input. A detailed example of an agent 315, in accordance with some embodiments, is described below with respect to FIG. 4.

Network 320 may include one or more radio access networks ("RANs"), via which user device 305 may access one or more other networks or devices, a core network of a wireless telecommunications network, an IP-based packet data network ("PDN"), a wide area network ("WAN") such as the Internet, a private enterprise network, and/or one or more other networks. In some implementations, network 320 may be, or include, a cellular network, such as a Long-Term Evolution ("LTE") network, a Third Generation ("3G") network, a Fourth Generation ("4G") network, a Fifth Generation ("5G") network, a Code Division Multiple Access ("CDMA") network, etc. User device 305 may connect, via network 320, to data servers, application servers, other user devices 305, etc. Network 320 may be connected to one or more other networks, such as a public switched telephone network ("PSTN"), a public land mobile network ("PLMN"), and/or another network.

Figure 4:
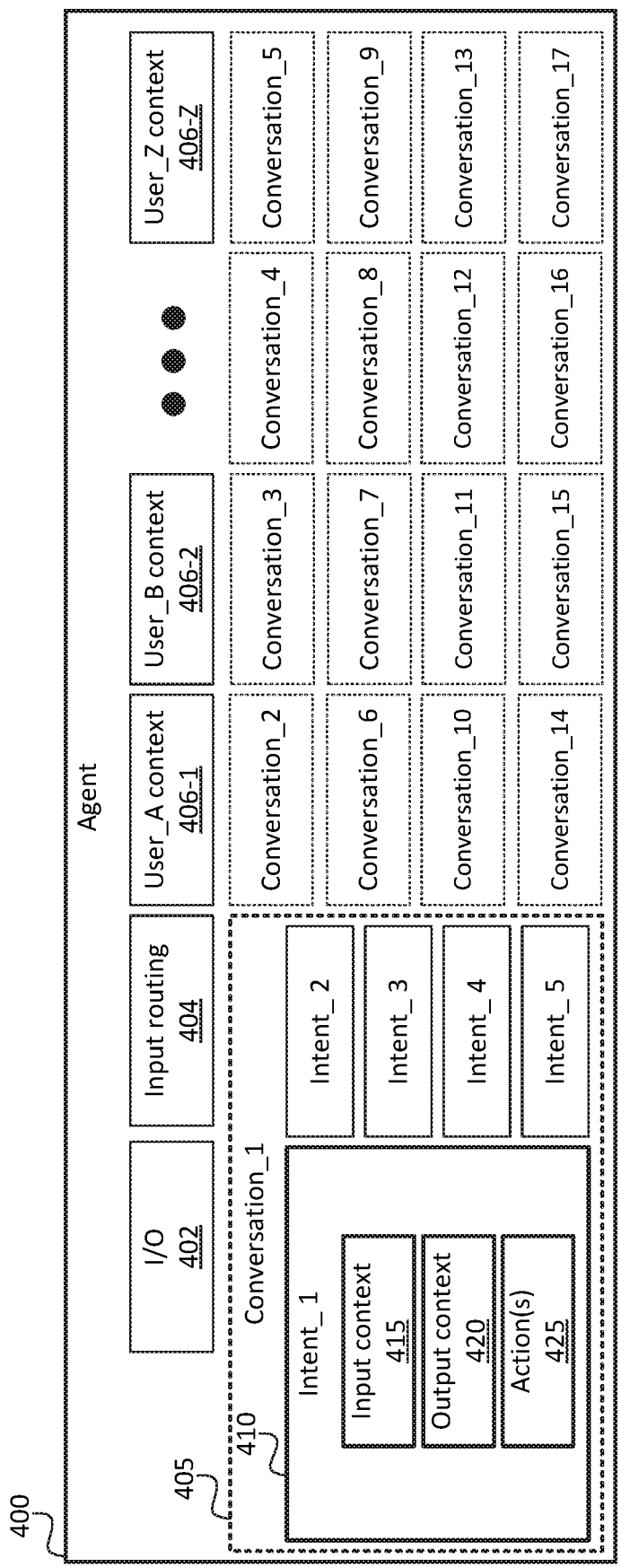
FIG. 4 illustrates an example of how a particular NLP agent may be defined and/or arranged.

FIG. 4 conceptually illustrates an example agent 400. As shown, agent 400 may include input/output ("I/O") component 402, input routing component 404, and one or more contexts 406 (e.g., contexts 406-1 through 406-Z, which may be referred to herein individually as "context 406" or in plural as "contexts 406"). In some embodiments, agent 400 may include additional, fewer, different, and/or differently arranged components. One or more of the components discussed herein (e.g., with regard to FIG. 4) may include (and/or may be implemented via) hardware circuitry, which may include one or more processors executing processor-executable instructions to perform one or more actions described herein.

I/O component 402 may receive user input from one or more devices, and/or may output information to one or more devices. For example, I/O component 402 may receive user input from UE 305, ARC 310, and/or some other device or system, and may output information (e.g., text content, instructions for an application programming interface ("API"), hyperlinks, images, and/or other information specified by one or more intents 410 included in agent 400) to UE 305, ARC 310, and/or some other device or system.

Input routing component 404 may receive user input (e.g., from I/O component 402), and may determine which intent 410 should handle the user input. In some embodiments, input routing component 404 may evaluate the user input, as well as some or all of the context 406 associated with the same user as the user input. For instance, input routing component 404 may receive user input, which may include (e.g., as metadata, as header information, and/or as some sort of other identifier) an identifier of a particular user or of a particular user device. Additionally, contexts 406 may also include identifiers that map each context 406 to a given user or user device. Input routing component 404 may identify the matching context 406 for the user or user device associated with user input based on matching the identifier, associated with the user input, to the identifier associated with context 406.

Context 406 may, generally, include information that can be used (e.g., by intents 410) to maintain the status of an interaction with a given user or device. The information stored in context 406 may include, and/or may be derived from, user input (e.g., as received via I/O component 402), information provided by one or more intents 410, and/or one or more other sources.

As discussed herein, interactions are discussed in terms of interactions with a "user." It is to be understood that when discussed herein, receiving input "from a user" may include receiving input from multiple different devices associated with that user. For instance, a user may provide first input via a first device (e.g., by speaking into a microphone of a "smart" watch), and then may subsequently provide second input via a second device (e.g., by selecting a button displayed in a GUI on a tablet computer). Thus, in these scenarios, the first and second inputs may be described herein as being received "from the user."

In this sense, a particular context 406 may maintain information that should be used whenever input is received from one particular user, independent of a unique identifier of a device via which the input is received. Additionally, or alternatively, a particular context 406 may be associated with a particular device (e.g., may include a device identifier, such as an International Mobile Subscriber Identity ("IMSI") value, International Mobile Station Equipment Identity ("IMEI"), media access control ("MAC") address, and/or another type of device identifier), such that a given context 406 may be device-specific, rather than user-specific.

In some embodiments, some or all of the context 406 for a particular user may be stored by one or more devices in addition to, or in lieu of, agent 400. For example, in some embodiments, context 406 may be stored by ARC 310. ARC 310 may obtain the context by making calls to an API of agent 400 to request the context from agent 400. In this manner, a current state of context 406 may be stored by ARC 310, and may be able to be provided by ARC 310 to another device or system. For example, ARC 310 may receive context 406 for a user from a Master Agent, and may provide some or all of the context 406 for the user to an agent 400 that is determined, by ARC 310, to handle subsequent interactions for the user.

FIG. 4 further shows multiple conversations 410, included in agent 400. As discussed herein, a "conversation" refers to a set of intents 410 that are interrelated in a way that may be meaningful to a user that is engaging in an interaction with an NLP system (e.g., an NLP system that utilizes agent 400). The concept of a "conversation" may, in some embodiments, not be explicitly stored or recognized by agent 400. However, embodiments herein are described as conceptually including conversations, as this concept may aid in understanding of such embodiments. The dashed lines in FIG. 4 reflect that, in some embodiments, "conversations" are not explicitly stored or acted upon by agent 400 (whereas intents 410 are stored and acted upon by agent 400).

This interrelation may involve information in one 410 that refers to another intent 410. Specifically, the intents 410 that make up a given conversation may interrelate, directly or indirectly, with each other by way of specifying that the input context 415 of a first intent 410 must include information that relates to a second intent 410 (e.g., an identifier of the second intent 410). In some embodiments, the input context 415 of a given intent 410 specifies conditions, rules, and/or other types of information that can be used to determine whether the given intent 410 matches user input (e.g., as received via 402) and the current context 406 for the user.

Thus, when selecting a suitable intent 410 to receive user input (e.g., as received via I/O component 402), input routing component 404 may evaluate the user input and the context 406 to determine whether the user input and the current context 406 match the conditions specified in input context 415 for one or more intents 410. For example, the user input "No" may be routed differently (e.g., to different intents 410) based on the context 406 (e.g., one context 406 may indicate that the user was asked whether he or she would like to cancel a service, while another context 406 may indicate that the user was asked if he or she would like to purchase a particular product).

Output context 420, for a particular intent 410, may include instructions, conditions, etc., that indicate parameters that should be outputted by the particular intent 410 when the particular intent 410 handles user input. For example, output context 420 may include an identifier of intent 410 (e.g., to indicate that intent 410 has been involved in the interaction with the user), may include an instruction to erase some or all prior items (e.g., specific identifiers of data to erase, such as file names; regular expressions that can be pattern matched to determine text to delete; or types of data to erase, such as file or content types) stored in output context 420, may include information (e.g., variables) to be used by other intents 410, etc.

Actions 425 for a particular intent 410 may indicate actions that should be performed by intent 410 when intent 410 receives user input and context 406. For example, actions 425 may include one or more API calls, performing a method or subroutine using some or all of the user input and/or context 406, generating a response, modifying output context 420, providing user output via I/O component 402, etc.

Figure 5A:
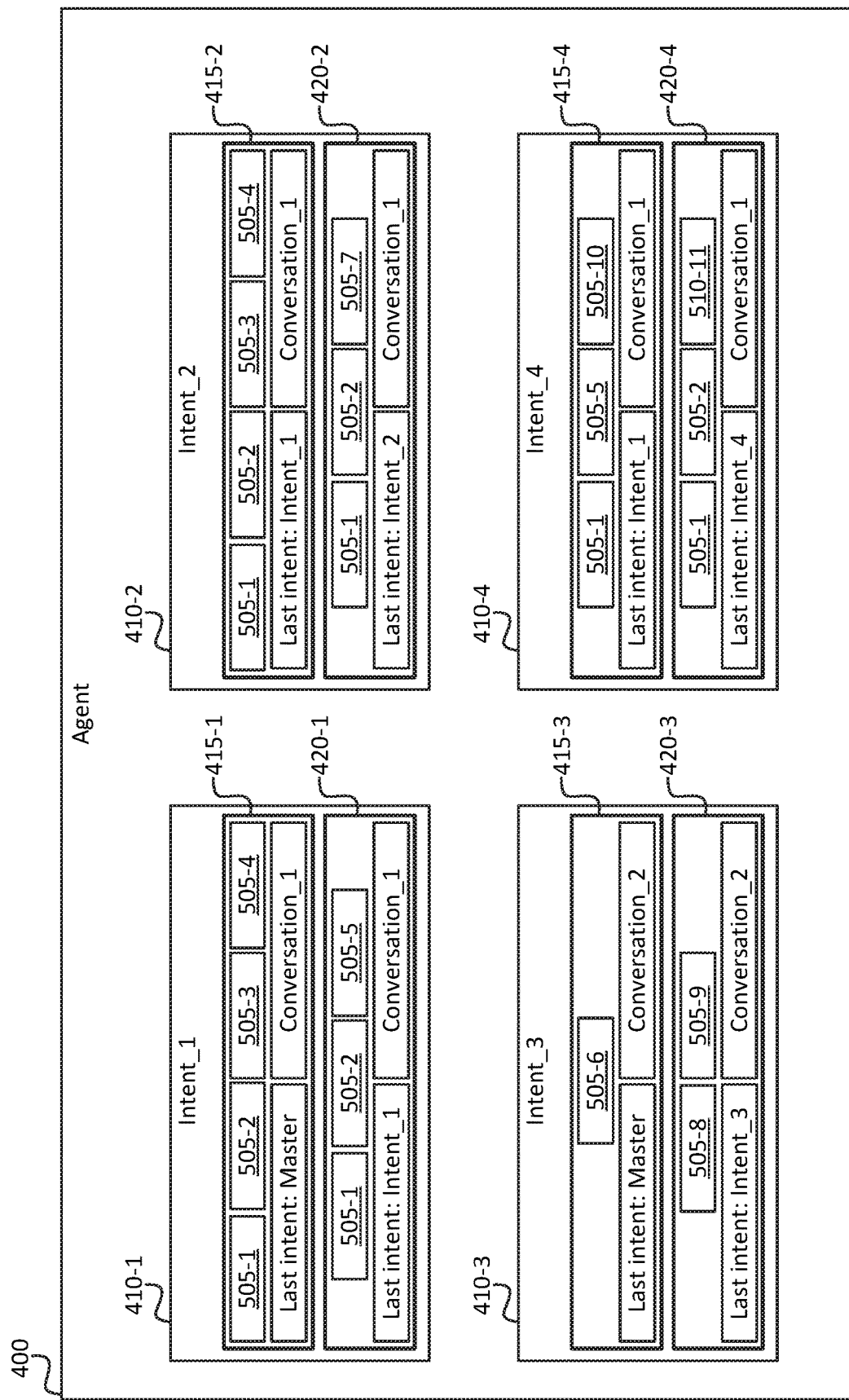
FIGS. 5A and 5B illustrate examples of how particular intents, within a given NLP agent, may be defined and/or arranged.

While some embodiments do not utilize explicit information related to conversations, FIG. 5A illustrates an example embodiment in which the concept of "conversations" is maintained within individual intents 410. For example, intents 410-1, 410-2, and 410-4 are associated with Conversation_1, while intent 410-3 is associated with Conversation_2. Specifically, for instance, intent 410-1 may include an identifier of Conversation_1 (shown in FIG. 5A as "Conversation_1) in the input context 415-1. Including identifiers of conversations may be useful to differentiate between intents that have similar input contexts 415 (e.g., similar or the same conditions specified in the input contexts), but have different output contexts 420 or actions 425. For example, if a user input is the word "No," and two different input contexts 415 of two different intents 410 include the condition that a user was asked if he or she would like to purchase a product, different conversations 405 may be used for different products (e.g., one conversation 405 may include subsequent intents 415 that relate to recommending cheaper products, while another conversation 405 may include subsequent intents 415 that relate to no longer asking if the user is interested in purchasing a product).

FIG. 5A also shows different context information 505 stored in input contexts 415 and output contexts 420. The distinct numbering (e.g., 505-1, 505-2, etc.) denotes distinct items stored within contexts 415 and/or 420. For example, context information 505-1 may include a name of a given user (e.g., as provided via user input and/or determined from a user account, with the explicit consent of the user), while context information 505-2 may include a phrase previously spoken by the user while engaged in an NLP dialog.

Input contexts 415, shown in FIG. 5A, also include a "Last intent" field. This field (or similar information) may be used to enforce the transition from one intent 415 to another, with a given set of user input. For example, input contexts 415-1 and 415-2, in this figure, have the same context information items 505-1, 505-2, 505-3, and 505-4. However, input context 415-1 specifies a condition that the last intent was "Master," while input context 415-2 a condition that the last intent was "Intent_1." Thus, in this sense, the last intent 410 that handled previous user input may be a differentiating factor for determining which intent 410 should handle present user input. Output contexts 420, shown in FIG. 5A, may also include (and/or may result from) rules specifying that intents 410 should specify themselves in the "Last intent" field.

Figure 5B:
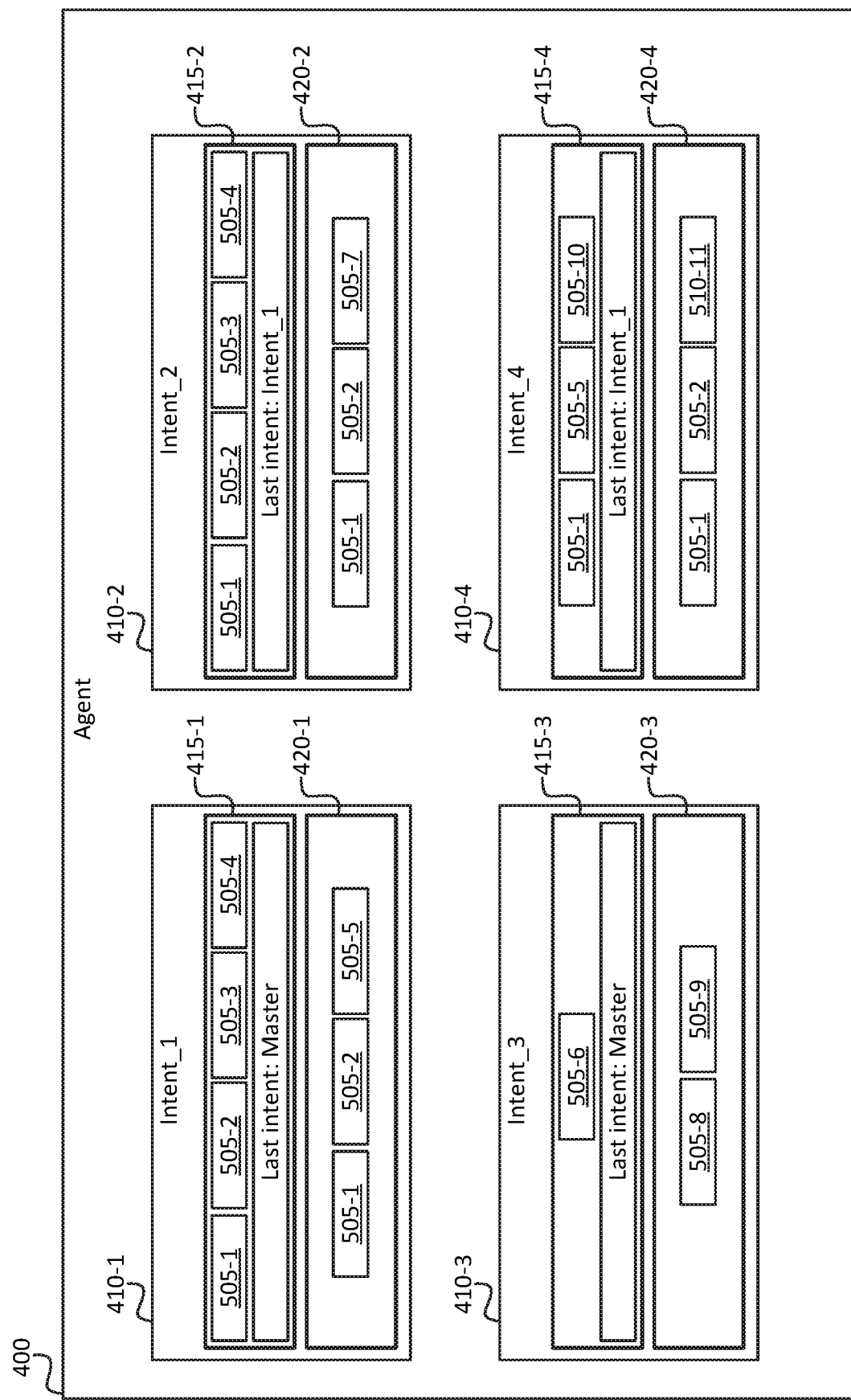

Additionally, or alternatively, input routing component 404 may maintain state information that indicates which intents 410 have handled input for a particular user or context 406, and may use such information when selecting an intent 410 to handle user input. For example, FIG. 5B illustrates a similar arrangement as FIG. 5A, but without information relating to conversations 405 stored in intents 410 (e.g., stored in input or output contexts 415 or 420). Additionally, in FIG. 5B, output contexts 420 may not explicitly specify that intents 410 should modify a "Last intent" field. For example, as discussed above, input routing component 404 may maintain information indicating which intents 410 have handled user input for a particular user.

Figure 6:
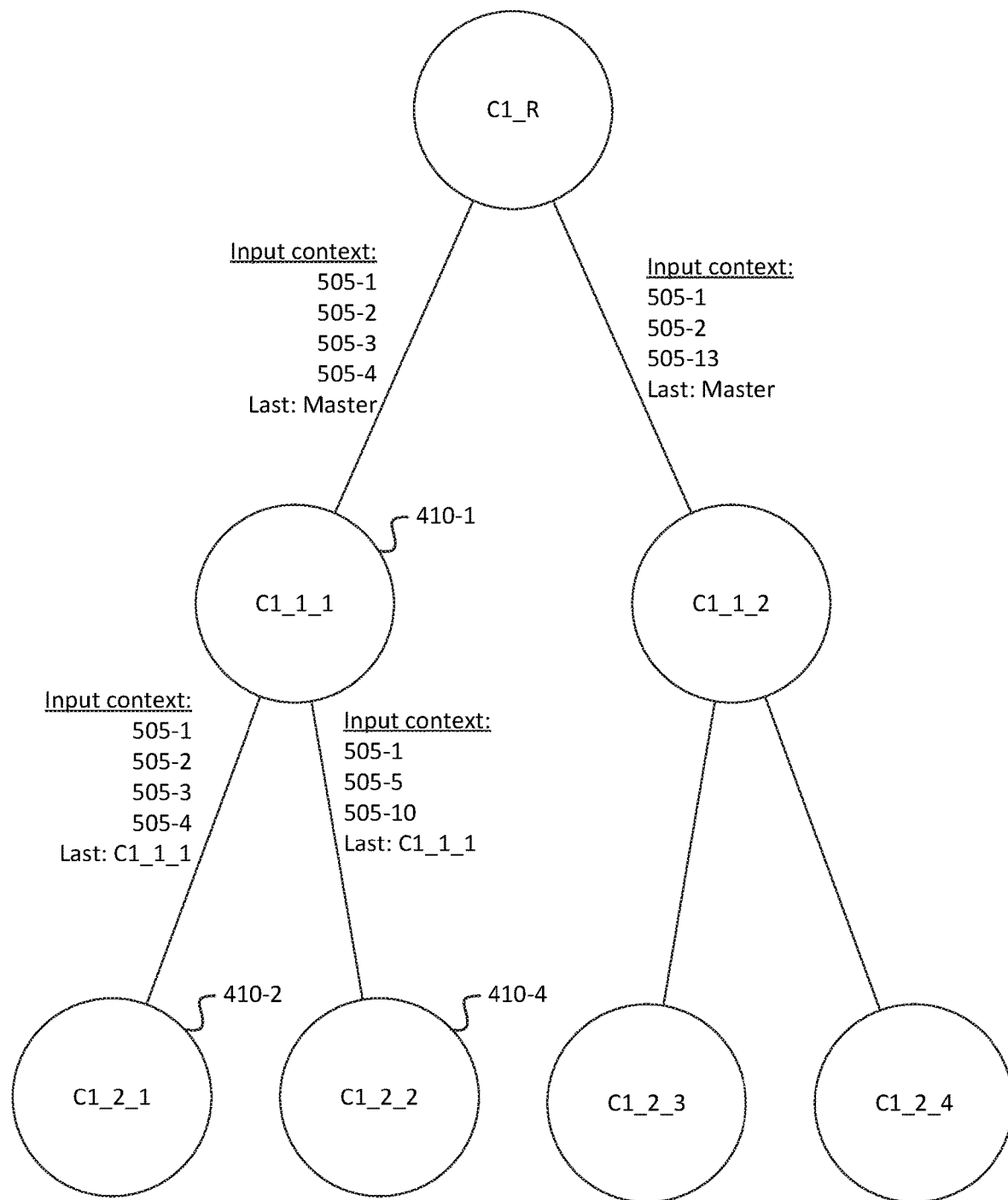
FIG. 6 conceptually illustrates an NLP conversation in tree form.

FIG. 6 provides another representation of how a conversation with a user can be arranged (e.g., as a tree), as well as how this representation relates to the agents and intents described herein (e.g., as discussed above with respect to FIGS. 5A and 5B). The tree shown in FIG. 6 may be a portion of a structured conversation "C1" that has root node "C1_R" as an entry point to the conversation. For example, C1_R may be reached when a user input matches a particular pattern (e.g., as specified in an input context for an intent 410 that is used to implement C1_R).

Once C1_R has been reached, it may be recognized and/or determined (e.g., by input routing component 404 of an agent 400 that implements C1_R) that the input context for the user should include an identifier of C1_R (e.g., as a "last intent," and/or in a history or record of intents 410 that have been used in the conversation). Additionally, or alternatively, input routing component 404 may include information indicating that the last intent 410 in the conversation was a "Master" intent (e.g., a root node in a conversation). Input routing component 404 may include this information when a conversation state associated with the user indicates that a previous intent 410 has not been used in the conversation with the user.

Node C1_1_1 may be a "next level" node in the tree (e.g., with respect to C1_R). As shown, an input context for C1_1_1 may specify items 505-1, 505-2, 505-3, and 505-4, as well as a "Last intent" of "Master." Referring, for example, to FIG. 5B, input context 415-1 of intent 410-1 also specifies these same parameters. In this manner, C1_1_1 (in FIG. 6) may represent, or may be implemented by, intent 410-1 (in FIG. 5B).

Similarly, the "next level" nodes in the tree, with respect to C1_1_1, are C1_2_1 and C1_2_2. As shown in FIG. 6, C1_2_1 may share the same input context parameters as intent 410-2 in FIG. 5B. Thus, C1_2_1 (in FIG. 6) may represent, or may be implemented by, intent 410-2 (in FIG. 5B). Similarly, C1_2_2 (in FIG. 6) may represent, or may be implemented by, intent 410-4 (in FIG. 5B).

In some scenarios (e.g., provided the quantity of intents is below a maximum quantity for an agent), the conversation represented by the tree shown in FIG. 6 may be implemented by a single agent, as shown in FIG. 2. However, some embodiments may adapt a "flat" agent structure (e.g., where an entire conversation is implemented by one agent) to a hierarchical structure, in order to realize the benefits (e.g., increased capacity for intents) of the hierarchical structure.

Figure 7:
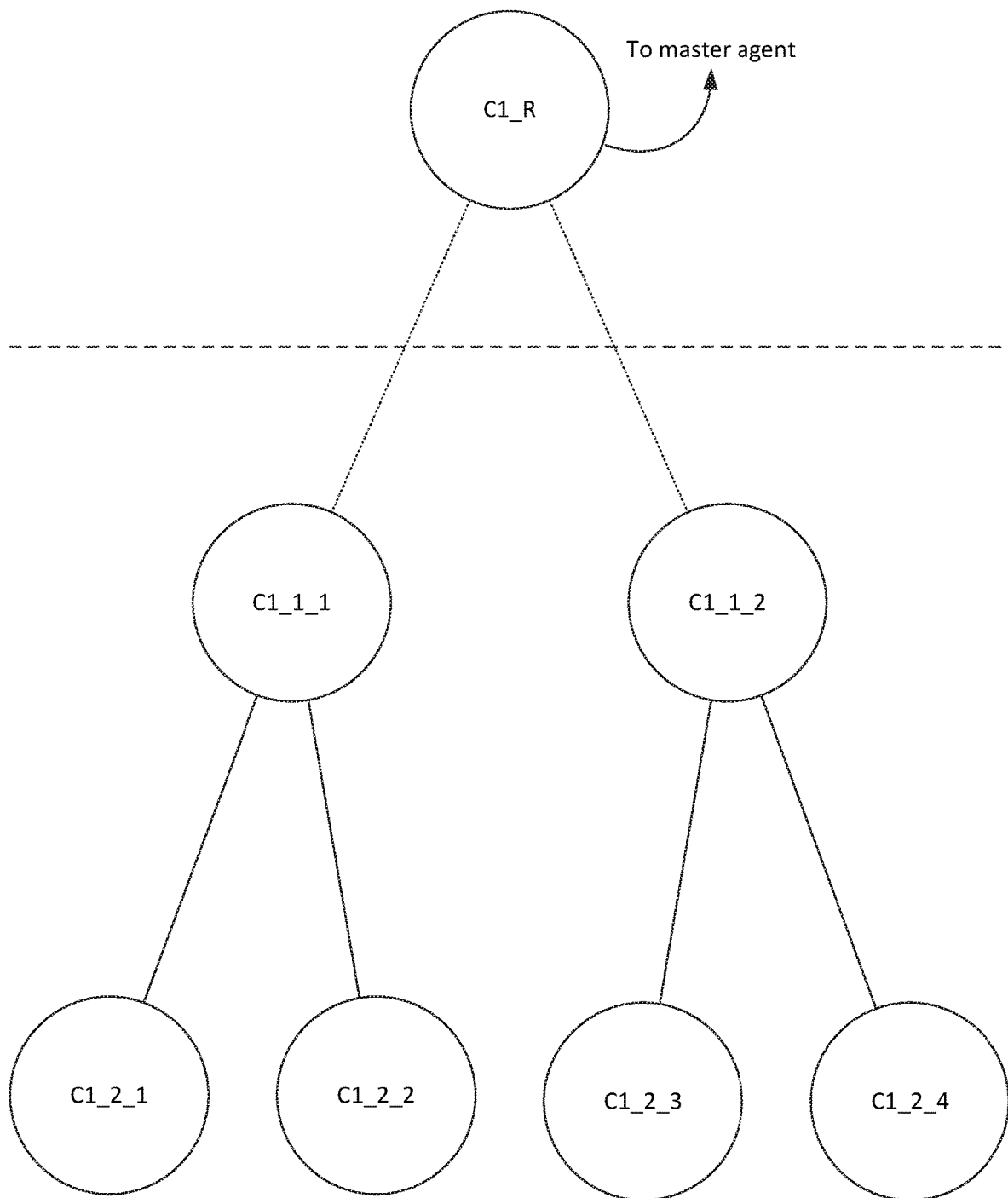
FIG. 7 conceptually illustrates the moving of the root node of an NLP conversation (e.g., as shown in FIG. 6) to a master agent.

For example, as shown in FIG. 7, adapting the conversation (shown in FIG. 6) to the hierarchical structure may involve moving C1_R to a Master Agent (e.g., placing an intent 410, which implements C1_R, in an agent 400 that is recognized by ARC 310 as a "top level" agent 400), and moving the next level nodes into other agents (e.g., placing intents 410, which implement the other nodes, in one or more agents 400 that are recognized by ARC 310 as "lower level" agents with respect to the "top level" agent 400). The removal of the root of the tree (e.g., the conceptual removal of C1_R, in FIG. 7) may be considered to result in two trees, where C1_1_1 is the root of one tree, and C1_1_2 is the root of the other tree. In some embodiments, ARC 310 may enforce a restriction that the intents 410 that implement the tree, of which C1_1_1 is the root, must be placed in the same agent 400, and that the intents 410 that implement the tree, of which C1_1_2 is the root, must be placed in the same agent 400. In some scenarios, this may result in the intents 410, that implement both trees, being placed in the same agent 400. In other scenarios, this may result in the intents 410, that implement both trees, being placed in two different agents 400.

Figure 8:
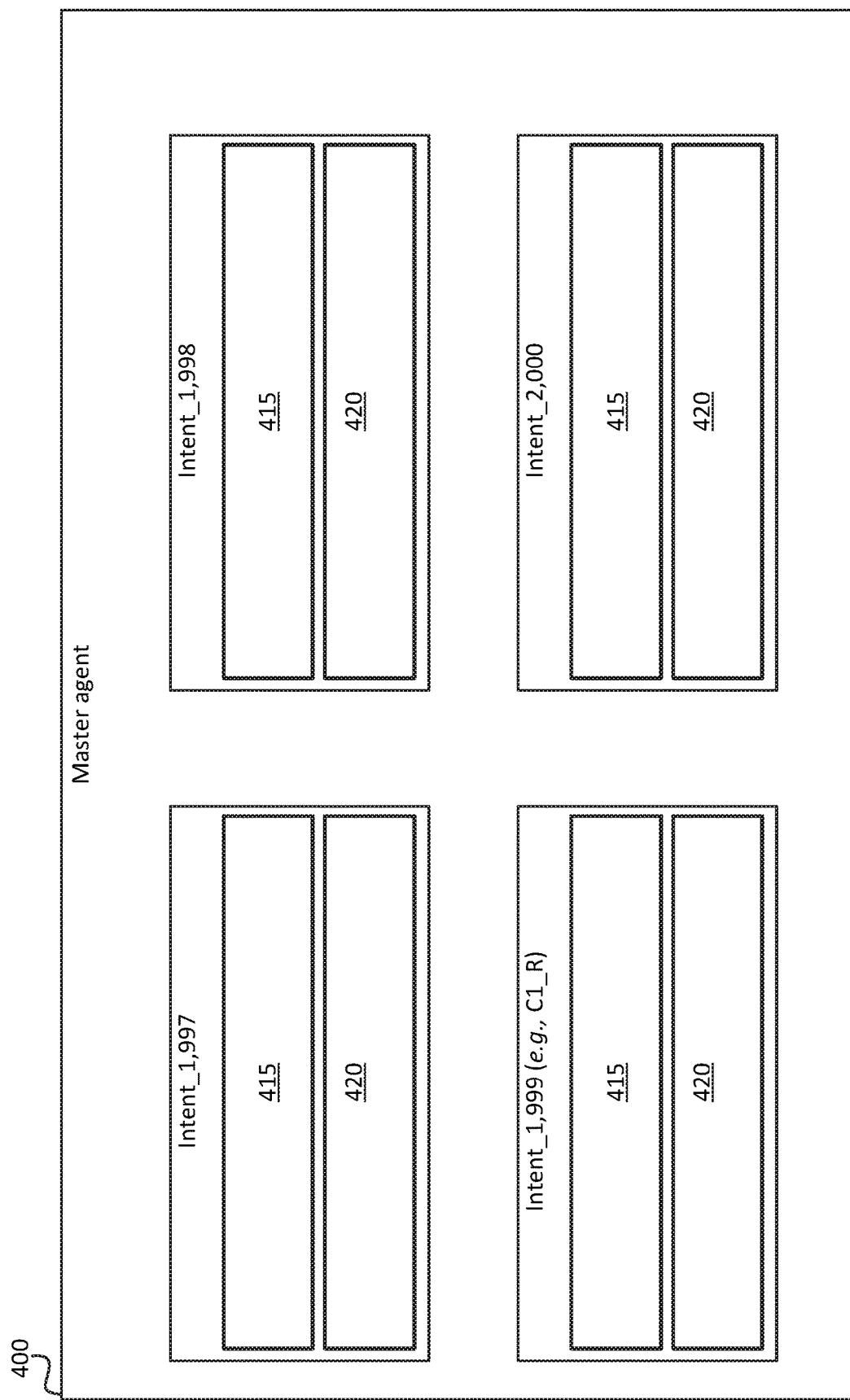
FIG. 8 illustrates an example of an NLP Master Agent, in accordance with some embodiments.

FIG. 8 illustrates an example agent 400, which may be designated (e.g., by ARC 310) as a Master Agent. Four example intents are shown in this figure, where each of the intents may correspond to a root of a conversation (e.g., as discussed above with respect to FIGS. 6 and 7). Specifically, for example, "Intent_1,999" (in FIG. 8) may represent, or implement, C1_R (in FIGS. 6 and 7).

FIG. 9 illustrates an example data structure 900, which may include mapping information that can be used by ARC 310 to route user input to an appropriate agent (e.g., to continue an NLP interaction with a user). For example, ARC 310 may extract input context parameters from intents 410, that implement nodes (e.g., referring to the example representation shown in FIGS. 7 and 8) that are next level nodes with respect to the roots of conversations.

For example, a particular intent 410 may specify a user input of "I want to look at my bill," may specify that a "Last intent" should be "Intent_1,997," and may have additional parameters 505-1, 505-3, and 505-4 specified in its input context 415. This particular intent 410 may also be stored in a particular agent, out of a set of agents (e.g., agent 400-1, in this example). ARC 310 may maintain this information in data structure 900. For example, when adapting a "flat" agent structure to a hierarchical one (e.g., as mentioned above and as discussed in greater detail below with respect to FIG. 10), ARC 310 may analyze the input context 415 of the intents 410 that implement "next level" nodes (e.g., with respect to root nodes) of conversations to determine the information stored in data structure 900.

Figure 10:
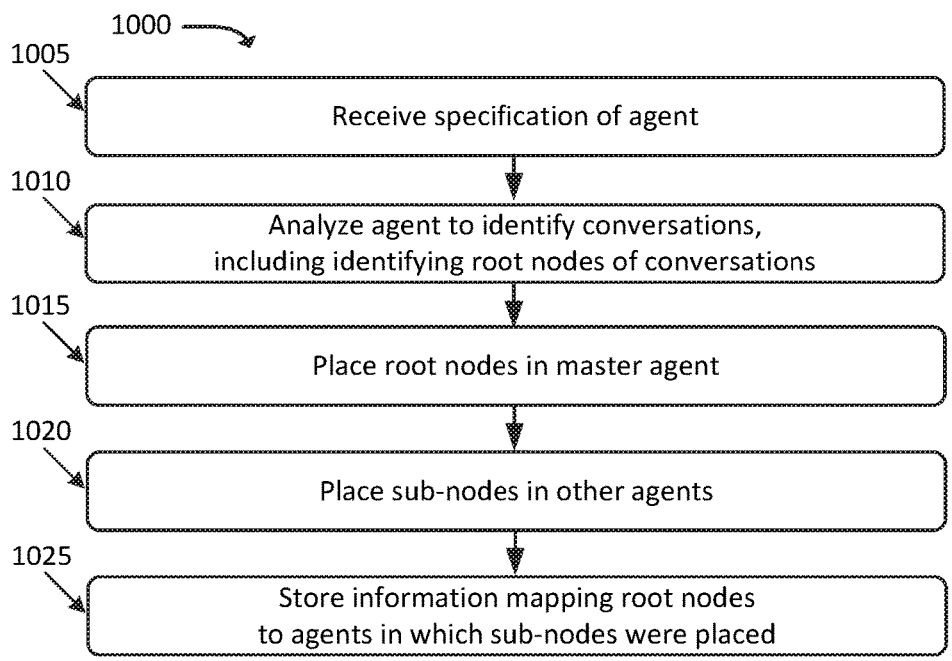
FIG. 10 illustrates an example process for adapting intents, in a flat NLP agent, to a hierarchical arrangement in accordance with some embodiments.

FIG. 10 illustrates an example process 1000 for adapting a "flat" agent structure to a hierarchical one, in accordance with some embodiments. In some embodiments, some or all of process 1000 may be performed by ARC 310. In some embodiments, one or more other devices and/or systems may perform some or all of process 1000 in addition to, or in lieu of, ARC 310.

As shown, process 1000 may include receiving (at 1005) a specification of an agent. For example, ARC 310 may receive information, such as computer code, one or more extensible markup language ("XML") documents, and/or some other form of information that specifies or defines an agent 400, including one or more intents 410 (e.g., as similarly described above).

Process 1000 may also include analyzing (at 1010) the agent to identify conversations, including identifying root nodes of the conversations. For example, in some embodiments, ARC 310 may identify conversations and their roots based on explicit information included in the intents 410 of agent 400. In some embodiments, ARC 310 may construct one or more trees, which may be conceptually or actually similar to the tree shown in FIG. 7, based on an analysis of which intents 410, of agent 400, refer to other agents 410. For instance, referring to FIG. 5B, ARC 310 may identify that Intent_2 (i.e., intent 410-2) is a "next level" node of Intent_1 (i.e., intent 410-1), because Intent_1 is specified in the input context 415-2 of Intent_2. Further, a particular intent 410 may be recognized as a "root" if no other intents 410 are specified in the input context 415 of the particular intent 410.

Process 1000 may additionally include placing (at 1015) the identified root nodes into a master agent. For example, ARC 310 may store information that identifies a particular agent 400 as a master agent. ARC 310 may place the root node in the master agent by, for example, copying an intent 410, that implements the root node, into the master agent (and/or generating a new intent 410 in the master agent with the some or all of the same parameters as the intent 410 that implements the root node).

Process 1000 may also include placing (at 1020) subnodes (e.g., nodes that are of a lower level than the root nodes) into other agents. For example, ARC 310 may identify one or more other agents 400 that are used to store intents 410 that relate to nodes that are lower level than root nodes, and may copy, generate, and/or otherwise store information in the identified agent 400 that causes agent 400 to store intents 410 that implement the lower level nodes, including storing the input and output contexts 415 and 420.

Figure 11:
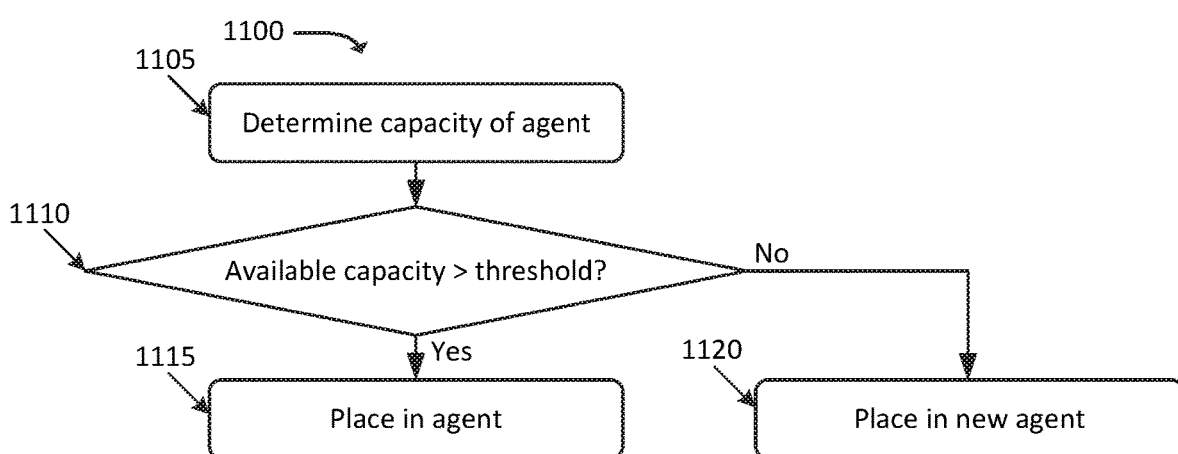
FIG. 11 illustrates an example process for placing intents, that are sub-nodes of a conversation, into an agent with suitable capacity.

FIG. 11 illustrates an example process 1100 for placing intents 410 into an agent 400 (e.g., according to block 1020). For instance, as shown in FIG. 11, process 1100 may include determining (at 1105) a capacity of a current agent 400, in which intents 410 are being placed. For example, ARC 310 may determine a quantity of intents 410 that are currently used by in agent 400, and compare the used quantity to a maximum quantity of intents 410 (e.g., 2,000 intents) that are supported by agent 400. Additionally, or alternatively, agent 400 may store explicit information indicating a quantity of available intents 410 (e.g., if 1,200 intents are currently used by agent 400, then the capacity may be 800 intents).

Process 1100 may also include determining (at 1110) whether the available capacity of agent 400 exceeds a threshold. For example, ARC 310 may determine whether agent 400 has at least 300 intents available. In some embodiments, the threshold capacity may vary, based on the quantity of intents 410 to be copied to agent 400. For example, if 200 intents 410 are to be copied to agent 400, then the threshold capacity may be 500 (e.g., 200 intents with a cushion of 300 additional intents).

If agent 400 can support the additional intents 410 (at 1110—YES), then ARC 310 may place the intents 410 into agent 400. If, on the other hand, agent 400 cannot support the additional intents 410 (at 1110—NO), then ARC 310 may place intents 410 into a new agent 400 (e.g., may create or instantiate a new agent 400, and place intents 410 into the new agent 400).

Returning to FIG. 10, process 1000 may further include storing (at 1025) information mapping root nodes to agents in which the sub-nodes were placed. For example, ARC 310 may store the information in data structure 900, discussed above with respect to FIG. 9. As mentioned above, this mapping information may be derived, at least in part, from intents 410 that implement "next level" nodes, that directly connect to root nodes in a conceptual conversation tree.

Figure 12:
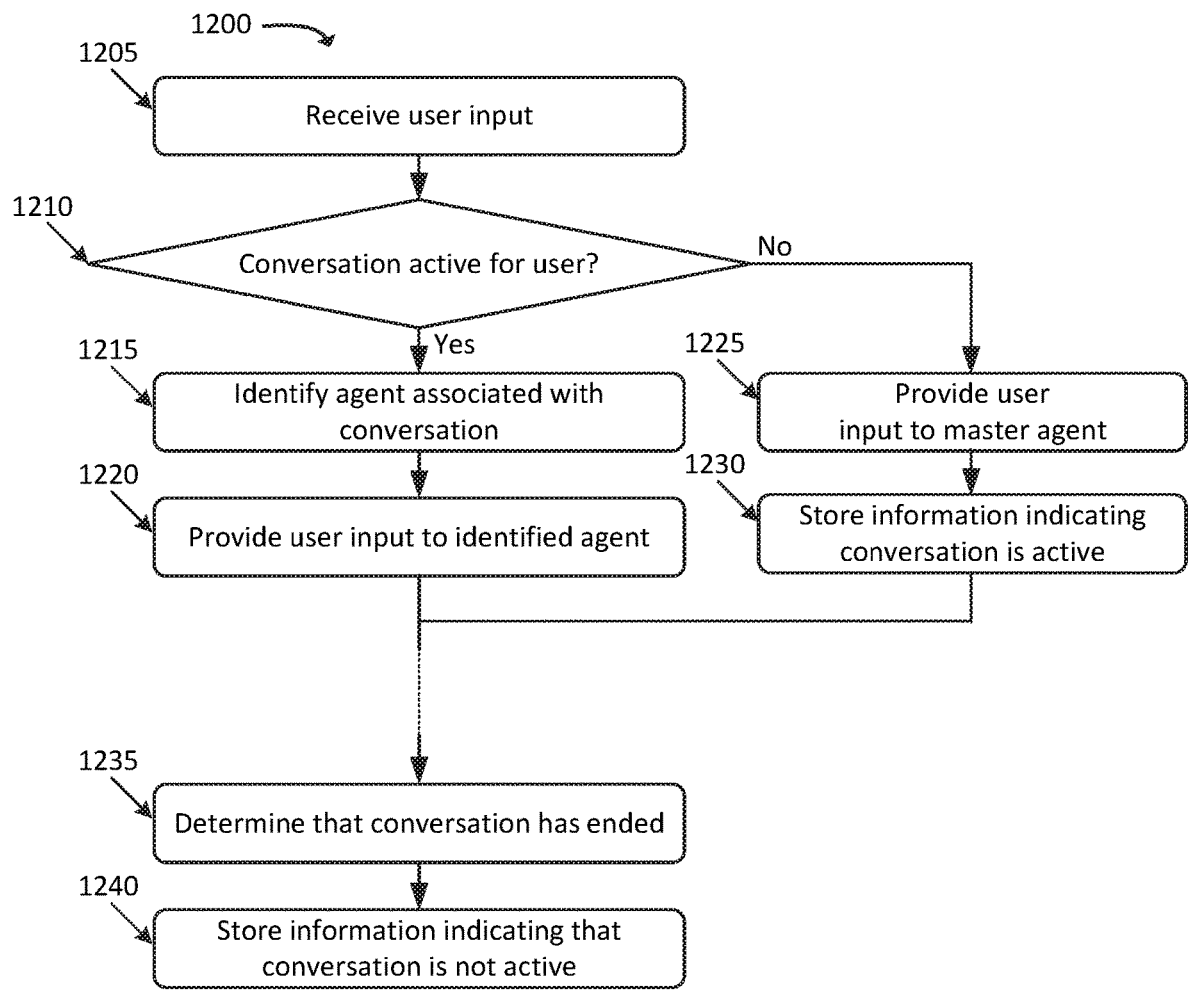
FIG. 12 illustrates an example process for routing user input to an appropriate NLP agent, in accordance with some embodiments.

FIG. 12 illustrates an example process 1200 for routing user input in accordance with some embodiments described herein. In some embodiments, some or all of process 1200 may be performed by ARC 310. In some embodiments, one or more other devices and/or systems may perform some or all of process 1200 in addition to, or in lieu of, ARC 310.

As shown, process 1200 may include receiving (at 1205) user input. For example, ARC 310 may receive input from UE 305, such as voice input, text input, selection of a GUI element, or the like.

Process 1200 may further include determining (at 1210) whether a conversation is active for the user. For example, ARC 310 may determine whether user input has been received from the user before (e.g., prior to the input received at 1205), which may generally relate to prior interactions in the same conversation. In some embodiments, ARC 310 may determine whether a flag or other indicator indicates that a conversation is active for the user (e.g., where unique identifiers may be used to differentiate between users).

FIG. 13 illustrates an example data structure 1300 that may be used by ARC 310 to determine whether a conversation is active for a user, and which agent 400 is handling the conversation for which user. For example, in the example shown in FIG. 13, a conversation may be active for User_A, and agent 400-1 may be handling the conversation for User_A. As also shown, User_C may have previously had a conversation that was handled by agent 400-3, but the current state of the conversation may be stored as not active in data structure 1300 (e.g., the conversation may have concluded).

Returning to FIG. 12, if a context is available (at 1210—YES), then process 1200 may include identifying (at 1215) an agent associated with the conversation. For example, the information referenced above (e.g., as also discussed with respect to FIG. 13) may indicate a particular agent 400 that is handling user input for the particular user. Process 1200 may further include providing (at 1220) the user input to the identified agent, which may handle the input accordingly (e.g., perform one or more actions, such as providing a response to the user.

If, on the other hand, a conversation is not active for the user (at 1210—NO), then process 1200 may include providing (at 1225) the user input to an agent that has been designated as a Master Agent. Process 1200 may further include storing (at 1230) information indicating that a conversation is active for the user. For example, ARC 310 may store, in data structure 1300, the information indicating that the conversation is active, and may also indicate the agent to which should handle subsequent interactions in the conversation (e.g., which may be determined based on a response from the Master Agent, which may indicate which agent 400 should handle the subsequent interactions for the conversation).

After some time, and potentially with one or more other intervening acts (which may include a repeated occurrence of one or more of blocks 1205-1230), ARC 310 may determine (at 1235) that the conversation has ended. For example, ARC 310 may receive an explicit indication from UE 305, the particular agent 400 handling the conversation, and/or from some other source, that the conversation has ended. Additionally, or alternatively, ARC 310 may automatically determine that the conversation has ended if no user input has been received for a threshold quantity of time (e.g., 5 minutes, 10 minutes, etc.).

ARC 310 may store (at 1240) information indicating that the conversation is not active. For example, ARC 310 may modify an entry in data structure 1300, for the user, indicating that a conversation is not active. Additionally, or alternatively, ARC 310 may remove the entry in data structure 1300 for the user.

Figure 14A:
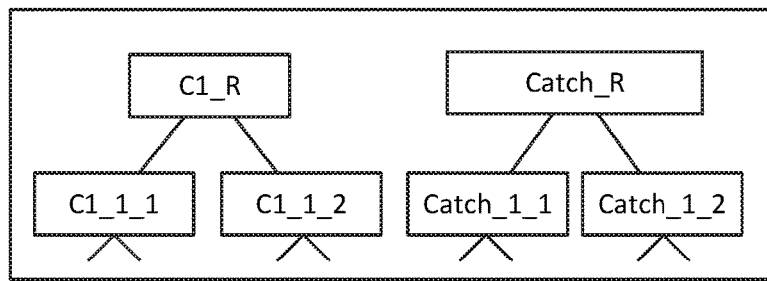
FIGS. 14A and 14B illustrate an example of copying a catch-all conversation to multiple levels of a hierarchical agent structure.

In some embodiments, a "flat" agent may include one or more intents 410 that are related to "catch-all" conditions. For example, as shown in FIG. 14A, an agent may conceptually include nodes related to conversation C1 (e.g., C1_R, C1_1_1, and C1_1_2), as well as nodes related to catch-all conversation Catch (e.g., Catch_R, Catch_1_1, and Catch_1_2). When adapting the flat agent to a hierarchical structure (e.g., according to process 1000), ARC 310 may copy the entirety of the catch-all conversation to each agent 400 that is generated.

Figure 14B:
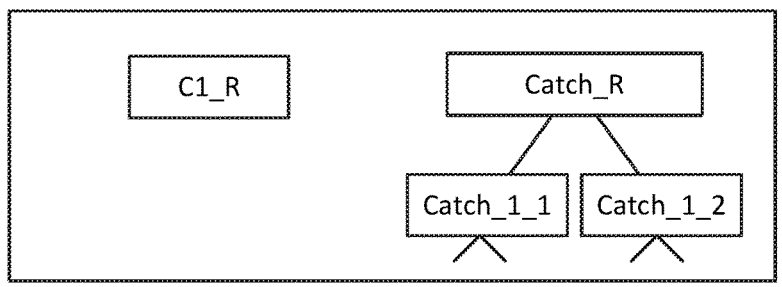
Figure 14B:
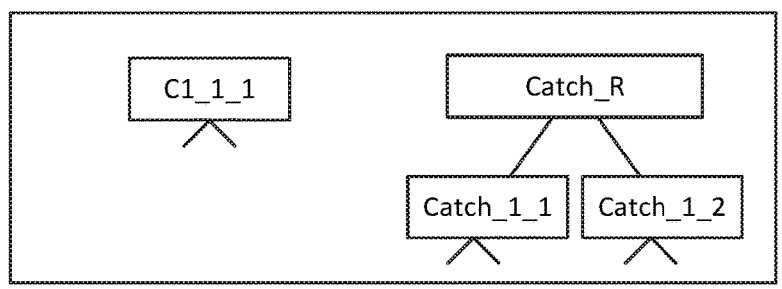
Figure 14B:
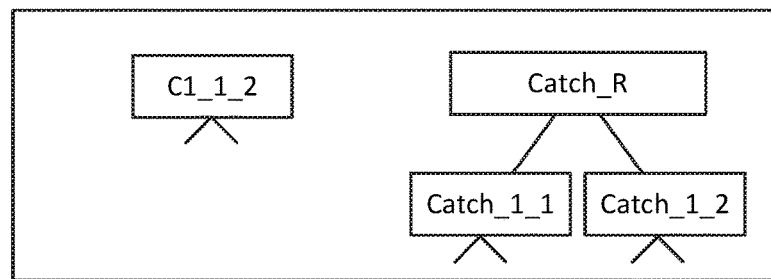

For example, as shown in FIG. 14B, while adapting conversation C1 may involve three separate agents (e.g., a first agent 400 acting as a Master Agent to include C1_R, a second agent to include C1_1_1 (and its sub-nodes), and a third agent to include C1_1_2 (and its sub-nodes). As also shown in FIG. 14B, the entirety of the Catch conversation may be placed in each of these three agents. ARC 310 may identify an intent that is a root of a "catch-all" conversation by, for example, detecting that the set of the input conditions for a given intent has no input conditions, and may detect the other nodes of the catch-all conversation by identifying intents that refer back to the intent that implements the root node.

Figure 15:
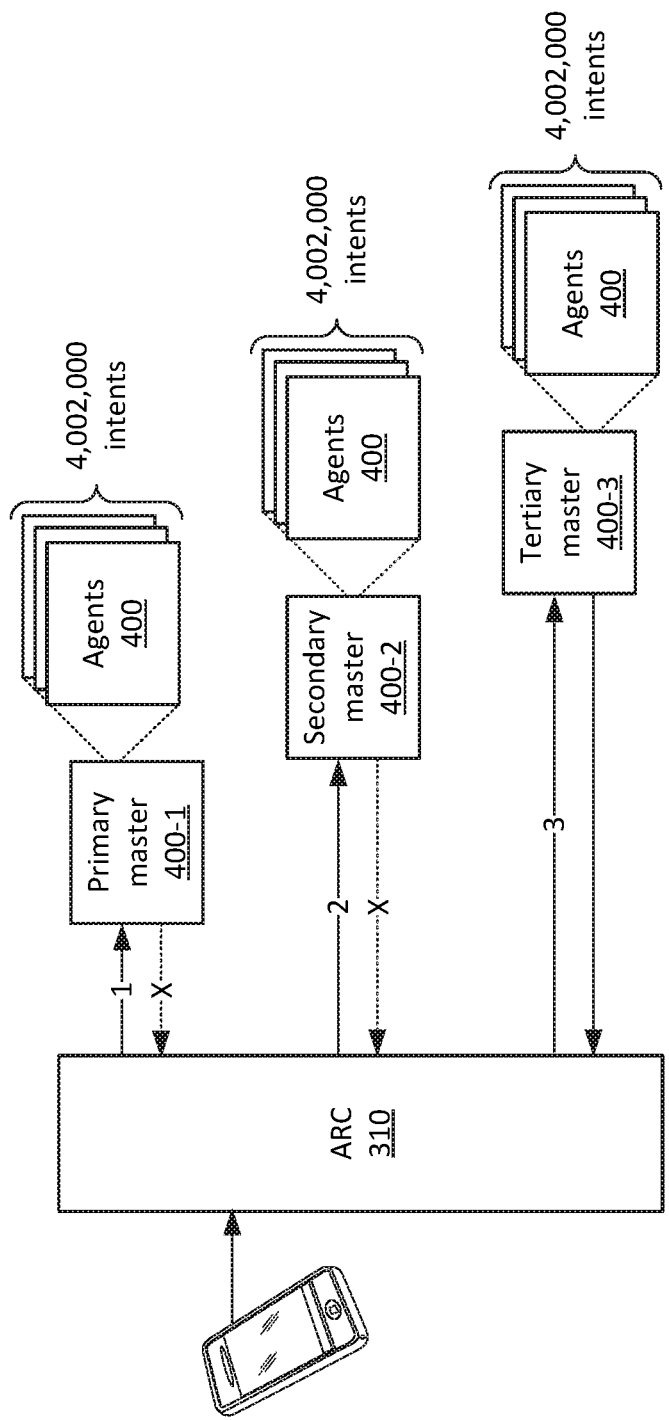
FIG. 15 illustrates an example embodiment, in which multiple master agents are used at the top level of a hierarchical agent structure.

While the above embodiments are described in terms of one master node, other arrangements are possible in the hierarchical agent structure described herein. For example, as shown in FIG. 15, multiple master agents may be used (e.g., Primary master 400-1, Secondary master 400-2, and Tertiary master 400-3). ARC 310 may maintain information that indicates that, for new conversations (e.g., when input is received from a user for whom a conversation is not active), the input should be first routed to Primary master 400-1 (e.g., at arrow 1). If a "miss" occurs (e.g., if Primary master 400-1 is unable to match the input to any of the intents 410 of Primary master 400-1), Primary master 400-1 may respond to ARC 310 that no intent 410 was able to be identified for the user input. ARC 310 may then, based on being notified that a miss occurred at Primary master 400-1, provide the user input to Secondary master 400-2 (e.g., at arrow 2). If a miss occurs at Secondary master 400-2, ARC 310 may then provide the user input to Tertiary master 400-3 (e.g., at arrow 3), and so on. As noted above, each master agent may link to a theoretical maximum of 4,000,000 intents (assuming that the maximum quantity of intents for each agent is 2,000). Thus, utilizing three master agents, as shown in FIG. 15, may allow for a capacity of 12,006,000 intents. Utilizing Q master agents in this way, where each agent supports P intents, would yield the ability to design an NLP system with (Q+1)*P intents.

In some embodiments, multiple levels of hierarchy may be used. For instance, referring to the example of FIG. 7 (and according to, for example, process 1000), note that C1_1_1 and C1_1_2 are the roots of their respective trees after C1_R is removed. The same, or similar, process may be performed to place C1_1_1 and C1_1_2 into an agent that is subordinate to the master agent in which C1_R is placed, and to place the remaining next level nodes (e.g., C1_2_1, C1_2_2, C1_2_3, and C1_2_4) into one or more agents that are subordinate to the agent(s) in which C1_1_1 and C1_1_2 are placed.

Figure 16:
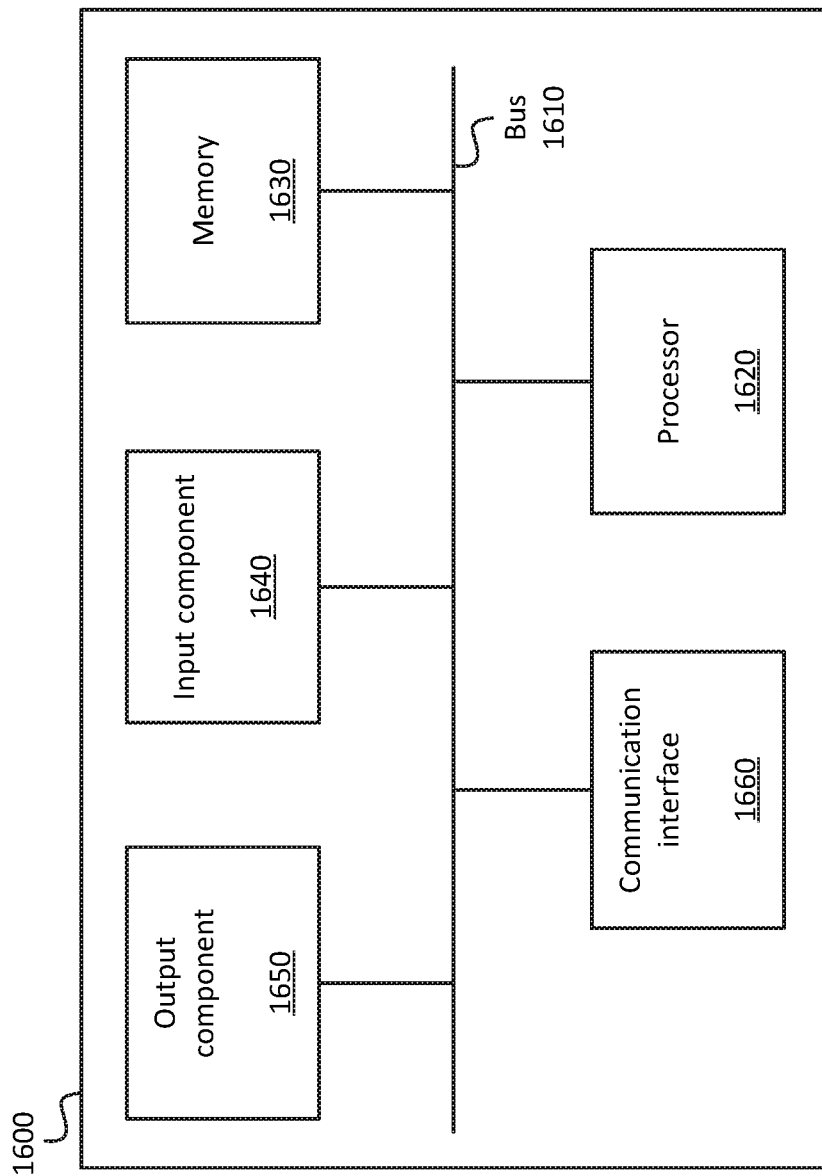
FIG. 16 illustrates example components of one or more devices, according to one or more embodiments described herein.

FIG. 16 illustrates example components of device 1600. One or more of the devices described above may include one or more devices 1600. Device 1600 may include bus 1610, processor 1620, memory 1630, input component 1640, output component 1650, and communication interface 1660. In another implementation, device 1600 may include additional, fewer, different, or differently arranged components.

Bus 1610 may include one or more communication paths that permit communication among the components of device 1600. Processor 1620 may include a processor, microprocessor, or processing logic that may interpret and execute instructions. Memory 1630 may include any type of dynamic storage device that may store information and instructions for execution by processor 1620, and/or any type of non-volatile storage device that may store information for use by processor 1620.

Input component 1640 may include a mechanism that permits an operator to input information to device 1600, such as a keyboard, a keypad, a button, a switch, etc. Output component 1650 may include a mechanism that outputs information to the operator, such as a display, a speaker, one or more light emitting diodes ("LEDs"), etc.

Communication interface 1660 may include any transceiver-like mechanism that enables device 1600 to communicate with other devices and/or systems. For example, communication interface 1660 may include an Ethernet interface, an optical interface, a coaxial interface, or the like. Communication interface 1660 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 1600 may include more than one communication interface 1660. For instance, device 1600 may include an optical interface and an Ethernet interface.

Device 1600 may perform certain operations relating to one or more processes described above. Device 1600 may perform these operations in response to processor 1620 executing software instructions stored in a computer-readable medium, such as memory 1630. A computer-readable medium may be defined as a non-transitory memory device. A memory device may include space within a single physical memory device or spread across multiple physical memory devices. The software instructions may be read into memory 1630 from another computer-readable medium or from another device. The software instructions stored in memory 1630 may cause processor 1620 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described with regard to FIGS. 10-12, the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

Some implementations are described herein in conjunction with thresholds. To the extent that the term "greater than" (or similar terms) is used herein to describe a relationship of a value to a threshold, it is to be understood that the term "greater than or equal to" (or similar terms) could be similarly contemplated, even if not explicitly stated. Similarly, to the extent that the term "less than" (or similar terms) is used herein to describe a relationship of a value to a threshold, it is to be understood that the term "less than or equal to" (or similar terms) could be similarly contemplated, even if not explicitly stated. Further, the term "satisfying," when used in relation to a threshold, may refer to "being greater than a threshold," "being greater than or equal to a threshold," "being less than a threshold," "being less than or equal to a threshold," or other similar terms, depending on the appropriate context.

To the extent the aforementioned implementations collect, store, or employ personal information provided by individuals, it should be understood that such information shall be collected, stored, and used in accordance with all applicable laws concerning protection of personal information. Additionally, the collection, storage, and use of such information may be subject to consent of the individual to such activity (for example, through "opt-in" or "opt-out" processes, as may be appropriate for the situation and type of information). Storage and use of personal information may be in an appropriately secure manner reflective of the type of information, for example, through various encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:
   a non-transitory computer-readable medium storing a set of processor-executable instructions; and
   one or more processors configured to execute the set of processor-executable instructions, wherein executing the set of processor-executable instructions causes the one or more processors to:
     receive first user input associated with a particular user;
     determine, based on receiving the first user input, that a communication session is not active for the particular user;
     provide, based on the determination that a communication session is not active for the particular user, the first user input to a first agent that includes a first set of intents, wherein at least a first intent of the first set of intents specifies:
       one or more conditions to compare to the first user input, wherein a matching of the one or more conditions to the first user input indicates that the first intent should be selected from the first set of intents to handle the first user input,
       one or more actions to perform when the first intent is selected, and
       an identification of a second agent that is different from the first agent, wherein the second agent is a particular agent from a set of candidate agents, wherein each agent of the set of candidate agents is associated with a different respective set of intents;
     receive, from the first agent, the identification of the second agent to handle subsequent user input for the particular user;
     receive second user input associated with the particular user, after receiving the first user input;
     determine, based on receiving the second user input, that the communication session is active for the particular user; and
     provide, based on the determination that the communication session is active for the particular user, the second user input to the second agent, wherein the second agent is associated with a second set of intents that is different from the first set of intents and includes at least a second intent that includes at least a portion of the second user input as a condition for selection of the second intent to handle the second user input.

2. The device of claim 1, wherein executing the processor-executable instructions further causes the one or more processors to:
   receive one or more context parameters, for the particular user, that have been provided by the selected first intent;
   identify the one or more context parameters based on receiving the second user input and identifying that the communication session is active for the particular user; and
   further provide the one or more context parameters to the second agent, wherein the second intent further includes at least a portion of the one or more context parameters as the condition for selection of the second intent.

3. The device of claim 1, wherein executing the processor-executable instructions further causes the one or more processors to:
   store, based on receiving the identification of the second agent from the first agent, mapping information that correlates an identifier of the particular user to the second agent; and
   select, based on the mapping information, the second agent, from a plurality of agents, to handle the second user input, wherein the providing of the second user input to the second agent is based on the selection of the second agent.

4. The device of claim 1, wherein the one or more actions includes providing a response to a user device associated with the particular user.

5. The device of claim 1, wherein the first and second agents are provided via a natural language processing platform that enforces a limit on a quantity of intents included in each of the first and second agents.

6. The device of claim 1, wherein executing the processor-executable instructions further causes the one or more processors to:
   maintain separate sets of context parameters for separate users, whereby the user is associated with a first set of context parameters and wherein another user is associated with a second set of context parameters.

7. The device of claim 1, wherein the processor-executable instructions, to determine whether a communication session is active for the particular user, include processor-executable instructions to:
   determine whether the device stores a set of context parameters for the particular user.

8. A non-transitory computer-readable medium, storing a set of processor-executable instructions, which, when executed by one or more processors, cause the one or more processors to:
   receive first user input associated with a particular user;
   determine, based on receiving the first user input, that a communication session is not active for the particular user;
   provide, based on the determination that a communication session is not active for the particular user, the first user input to a first agent that includes a first set of intents, wherein at least a first intent of the first set of intents specifies:

one or more conditions to compare to the first user input, wherein a matching of the one or more conditions to the first user input indicates that the first intent should be selected from the first set of intents to handle the first user input, one or more actions to perform when the first intent is selected, and an identification of a second agent that is different from the first agent, wherein the second agent is a particular agent from a set of candidate agents, wherein each agent of the set of candidate agents is associated with a different respective set of intents;

receive, from the first agent, the identification of the second agent to handle subsequent user input for the particular user;

receive second user input associated with the particular user, after receiving the first user input;

determine, based on receiving the second user input, that the communication session is active for the particular user; and provide, based on the determination that the communication session is active for the particular user, the second user input to the second agent, wherein the second agent is associated with a second set of intents that is different from the first set of intents and includes at least a second intent that includes at least a portion of the second user input as a condition for selection of the second intent to handle the second user input.

9. The non-transitory computer-readable medium of claim 8, wherein the processor-executable instructions further include processor-executable instructions to:

receive one or more context parameters, for the particular user, that have been provided by the selected first intent;

identify the one or more context parameters based on receiving the second user input and identifying that the communication session is active for the particular user; and further provide the one or more context parameters to the second agent, wherein the second intent further includes at least a portion of the one or more context parameters as the condition for selection of the second intent.

10. The non-transitory computer-readable medium of claim 8, wherein the processor-executable instructions further include processor-executable instructions to:

store, based on receiving the identification of the second agent from the first agent, mapping information that correlates an identifier of the particular user to the second agent; and select, based on the mapping information, the second agent, from a plurality of agents, to handle the second user input, wherein the providing of the second user input to the second agent is based on the selection of the second agent.

11. The non-transitory computer-readable medium of claim 8, wherein the one or more actions includes providing a response to a user device associated with the particular user.

12. The non-transitory computer-readable medium of claim 8, wherein the first and second agents are provided via a natural language processing platform that enforces a limit on a quantity of intents included in each of the first and second agents.

13. The non-transitory computer-readable medium of claim 8, wherein the processor-executable instructions further include processor-executable instructions to:

maintain separate sets of context parameters for separate users, whereby the user is associated with a first set of context parameters and wherein another user is associated with a second set of context parameters.

14. A method, comprising:

receiving, by a device, first user input associated with a particular user;

determining, by the device and based on receiving the first user input, that a communication session is not active for the particular user;

providing, by the device, based on the determination that a communication session is not active for the particular user, the first user input to a first agent that includes a first set of intents, wherein at least a first intent of the first set of intents specifies:

one or more conditions to compare to the first user input, wherein a matching of the one or more conditions to the first user input indicates that the first intent should be selected from the first set of intents to handle the first user input, one or more actions to perform when the first intent is selected, and an identification of a second agent that is different from the first agent, wherein the second agent is a particular agent from a set of candidate agents, wherein each agent of the set of candidate agents is associated with a different respective set of intents;

receiving, by the device and from the first agent, the identification of the second agent to handle subsequent user input for the particular user;

receiving, by the device, second user input associated with the particular user, after receiving the first user input;

determining, by the device and based on receiving the second user input, that the communication session is active for the particular user; and providing, by the device and based on the determination that the communication session is active for the particular user, the second user input to the second agent, wherein the second agent is associated with a second set of intents that is different from the first set of intents and includes at least a second intent that includes at least a portion of the second user input as a condition for selection of the second intent to handle the second user input.

15. The method of claim 14, further comprising:

receiving one or more context parameters, for the particular user, that have been provided by the selected first intent;

identifying the one or more context parameters based on receiving the second user input and identifying that the communication session is active for the particular user; and further providing the one or more context parameters to the second agent, wherein the second intent further includes at least a portion of the one or more context parameters as the condition for selection of the second intent.

16. The method of claim 14, further comprising:

store, based on receiving the identification of the second agent from the first agent, mapping information that correlates an identifier of the particular user to the second agent; and select, based on the mapping information, the second agent, from a plurality of agents, to handle the second user input, wherein the providing of the second user input to the second agent is based on the selection of the second agent.

17. The method of claim 14, wherein the one or more actions includes providing a response to a user device associated with the particular user.

18. The method of claim 14, wherein the first and second agents are provided via a natural language processing platform that enforces a limit on a quantity of intents included in each of the first and second agents.

19. The method of claim 14, further comprising:
maintaining separate sets of context parameters for separate users, whereby the user is associated with a first set of context parameters and wherein another user is associated with a second set of context parameters.

20. The method of claim 14, wherein determining whether a communication session is active for the particular user, includes:
determining whether the device stores a set of context parameters for the particular user.

* * * * *